United States Patent Office 3,138,746
Patented June 23, 1964

3,138,746
ELECTROLYTIC CAPACITORS AND
ELECTROLYTE THEREFOR
Francis J. P. J. Burger, Toronto, Ontario, and David Malcolm Cheseldine, Langstaff, Ontario, Canada, assignors, by mesne assignments, to Her Majesty the Queen, in right of Canada, as represented by the Minister of National Defence
No Drawing. Filed May 1, 1961, Ser. No. 106,504
Claims priority, application Canada May 2, 1960
23 Claims. (Cl. 317—230)

This invention relates to improved electrolytic capacitors and in particular to electrolytes suitable for use in those capacitors with such electrolytes being capable of forming anodic dielectric films on such film forming metals as aluminum, tantalum and the like.

Though, for a variety of reasons, this is not always possible, it would nevertheless be desirable for such electrolytes to have high electrical conducitvity.

They must also be non-corrosive towards the electrodes and other elements of capacitors in which they are used. This latter condition especially has imposed limitations on the ionogens which can be employed in such electrolytes, particularly when used in conjunction with capacitors in which at least one of the electrodes is of aluminum. In practice, the most widely used ionogens for electrolyes in such capacitors are borates and, due to the limited solubility of borates in many solvents, ethylene glycol is the one most widely used. Such electrolytes suffer from a number of disadvantages, in particular their unsuitability for working temperatures above 85° C. or below —40° C., or at voltages below 25 v. They are also unsuitable for use in capacitors requiring highly conducting electrolytes as exemplified by the so-called wet slug type of capacitor where the anode consists of a sintered, porous block (the "slug") of a film forming metal, usually tantalum.

It is an object of this invention to provide an electrolytic capacitor of improved high and low temperature performance, with at least one of the electrodes of this capacitor being of aluminum, tantalum or other film forming metal, and with such capacitor incorporating an improved electrolyte formulated in accordance with the present invention.

It is another object to provide improved electrolytes of high conductivity, suitable for capacitors of improved high and low temperature performance.

A further object is to provide electrolytes which are non-corrosive.

Yet other objects and the advantages of the invention will become apparent from the following description and examples.

Essentially, the electrolyte system of this invention comprises an ionogen (1), namely formic acid, neutralized or partially neutralized with ammonia or an amine, dissolved in a suitable solvent (2). Furthermore, it also includes, in a relatively low concentration, one or more other anion species (3) of the type more generally used for forming oxide films on aluminum or tantalum. More specifically and with regard to this latter species of anion, the leakage current of a capacitor is found to be reduced if anions belonging to the group of borate, phosphate or phosphite are present in the electrolyte either separately or in combination. These latter anions need only be present in concentrations of about 1% or even less, hence their contribution to the conductivity of the electrolyte is relatively small. At such concentrations, the solubility product of either the ammonium or amine salts of these anions is not exceeded in many solvents inside the working temperature range of —55° C. to 125° C. This fact offers a wider choice of solvents than exists for electrolyte systems in which borates are the main ionogens and are relied upon to make the major contribution towards electrolytic conductivity.

While it should be understood that the borate, phosphate or phosphite ions may be present at higher concentrations where the nature of the solvent permits this, in general, however, concentrations below 5% have been found to be most satisfactory, higher concentrations tending to undesirably increase the viscosity, and hence the resistance, of the electrolyte at low temperatures.

The reason why such ions are able to cause a substantial reduction in leakage current of capacitors containing the electrolyte is not fully known at present but this may be due to the formation of a protective film of adsorbed ions which covers the anode under positive potential and prevents the action of the more corrosive ions in the electrolyte. On the other hand, in certain cases where these ions have been present in the electrolyte, a limited decrease in capacity has been noticed to take place over an initial period of time when a potential is first applied to the capacitor and this could be attributed to an electrochemically formed film on the positive electrode which at least partly functions as a dielectric but chiefly protects the initially formed anodic oxide dielectric proper.

The use of ammonia or amine formates as the conducting ionogen in the present electrolyte permits the solvent to be selected from a large range of compounds since formates are widely soluble. The formate ion, being relatively small and hence mobile, shows high conductivity in polar solvents which support ionization and the concentration of neutralized formate necessary to achieve any desired conductivity in an electrolyte is much less than the concentration of neutralized borate needed to produce the same conducitvity. For example, in a solvent consisting of 60% ethylene glycol and 40% water, a 2 M solution of boric acid neutralized with ammonia to a pH of about 7 has a specific resistance of about 150 ohm-cm. at 25° C., whereas a 2 M solution of formic acid neutralized with ammonia to the same pH has a resistivity of about 40 ohm-cm. at 25° C. in the same solvent.

It is a feature of this invention that the proposed electrolytes contain the solute in lower concentrations than electrolytes of similar resistivity in which neutralized borates are the only ionogen. This leads to smaller temperature coefficients in electrolyte resistance and to improved performance at low temperatures of capacitors in which the electrolyte is used.

Ammonia or amines are suitable for the neutralization or partial neutralization of formic acid as used in this invention. Primary, secondary or tertiary alkyl amines such as triethylamine and tert-butylamine, aromatic amines and other cyclic amines such as morpholine, pyridine and piperidine can be used as can substituted amines such as the ethanolamines provided the resulting formates are soluble in the selected solvent. The concentration of ammonium or amine formate used depends upon the conductivity which is desired in the electrolyte and will vary with the solvent and according to the working voltage of the capacitor containing the electrolyte. Thus, for capacitors of similar construction, the concentration of ammonium or amine formate will be less in electrolytes for use in capacitors of higher working voltages than that used in electrolytes for use in capacitors of lower working voltages. Concentrations of ammonium or amine formate between about 0.01 M and 5 M are preferable. The concentration depends upon the specific application. Many polar solvents can be used to dissolve the ionogens used in this electrolyte, including the following general glasses: Water, mono polyhydric alcohols, glycol ethers, amides and N-substituted amides, nitriles and substituted nitriles. More specifically, solvents can be chosen from the following group of compounds used either singly or as mixtures: water, methyl-, ethyl-, and propyl-alcohols, ethylene glycol, ethylene glycol monomethyl ether, ethylene glycol monoethyl ether, ethylene glycol monobutyl ether, ethylene glycol formamide, dimethyl formamide, dimethyl acetamide, glycolonitrile and methoxy propionitrile.

The choice of solvent is usually determined by the specific electrical characteristics required in the capacitor for which the electrolyte is designed. In particular, the working temperature range will in general limit the choice of solvents to those which remain liquid over approximately that range.

Since electrolytes according to this invention are adaptable for use with capacitors of widely varying constructions, the solvent must be selected with due regard to the material and the geometry of the electrode system. Thus for use in a capacitor with foil electrodes, at least one of which consists of aluminum, it is preferable to use a non-aqueous solvent since the presence of water in such capacitors, in combination with high temperature, is detrimental to the anodic oxide film, thus causing the capacity associated with the aluminum surface, and hence the capacity of the whole unit, to change. Solvents such as ethylene glycol, ethylene glycol monomethyl ether, ethylene glycol monoethyl ether, dimethyl formamide and dimethyl acetamide are particularly suitable for this type of application. For use in a capacitor in which tantalum foil electrodes are employed, aqueous electrolytes are suitable and in general a mixture of water and an organic solvent is chosen such that the system remains liquid over the temperature range in which the capacitor is required to operate. A similar system can be used in the type of capacitor employing a porous tantalum block as the anode and the container, usually of silver, as the cathode. For this application, a highly conducting electrolyte is desirable because of the relatively tenuous pore space through which the current has to travel from the can surface to reach all parts of the internal surface of the slug anode. A particularly suitable solvent for this application is a mixture of ethylene glycol and water.

Thus in accordance with one aspect the present invention concerns an electrolyte for use in an electrolytic capacitor comprising a solution containing formate anions, cations containing at least one nitrogen atom and an oxide film forming anion.

The present invention also relates to an electrolytic device comprising a pair of electrodes, at least one of which is formed of a film forming metal, and an electrolyte comprising a solution containing formate anions, cations containing at least one nitrogen atom, and an oxide film forming anion.

The following illustrative examples of electrolyte compositions together with typical applications in which they can be used will help to clarify the foregoing. It is to be understood however, that the electrolyte compositions as well as the applications revealed shall in no way limit the scope of this invention but merely serve as illustrations and to point out the advantages of the electrolyte system over the prior art.

*Example 1*

| | Percent by weight |
|---|---|
| Ethylene glycol | 90 |
| Ammonium formate | 5 |
| Ammonium biborate | 4 |
| Diammonium hydrogen phosphate | 1 |

The resistivity of Example 1 is about 330 ohm-cm. at 25° C. It is suitable for use in low voltage aluminum foil electrode capacitors. Units rated at 18 v. D.C. in which the electrolyte was used had dissipation factors of from 6 to 10% at 120 cps. at room temperature and retained about 85 to 90% of their capacitance at −30° C. After 1200 hours on life test at 85° C. the average leakage current at 85° C. had dropped from an initial value of 0.0007 μa./μf.-v. to .00015 μa./μf-v. The units lost about 5% of their initial capacity over the same period.

*Example 2*

| | Percent |
|---|---|
| Dimethyl formamide | 90 |
| Formic acid | 4.5 |
| Triethylamine | 3.5 |
| Boric acid | 1.5 |
| Phosphorous acid | 0.5 |

Example 2 has a resistivity of about 155 ohm-cm. at 25° C. and is particularly suitable for use in low voltage aluminum foil capacitors of wide working temperature range. An etched aluminum foil capacitor rated at 25 v. containing this electrolyte had a dissipation factor of 8% at 120 cps. and retained 89% of its capacity at −55° C. The capacitor was quite stable at 125° C. with the rated voltage applied and after 500 hours under these conditions the leakage current at 125° C. had dropped from an initial value of 0.0053 μa./μf.-v. to 0.0009 μa./μf.-v., the capacity showing a drop of 6% over the same period.

*Example 3*

| | Percent |
|---|---|
| Dimethyl formamide | 75 |
| Ethylene glycol monoethyl ether | 19 |
| Formic acid | 0.5 |
| Triethylamine | 0.7 |
| Boric acid | 4.8 |

Example 3 has a resistivity of about 950 ohm-cm. at 25° C. and is particularly suitable for use in high voltage aluminum foil capacitors of wide working temperature range. An etched aluminum foil capacitor rated at 350 v. containing this electrolyte had a dissipation factor of 3.5% at 120 cps. and retained 90% of its capacity at −55° C. After 2000 hours at 125° C. with the rated voltage applied the leakage current at 125° C. dropped from an initial value of 0.009 μa./μf.-v. to 0.0025 μa./μf.-v., the capacity showing a drop of 5% over the same period.

*Example 4*

| | Percent |
|---|---|
| Dimethyl formamide | 76 |
| Boric acid | 5.2 |
| Deionized water | 18.8 |

(refluxed to equilibrium)

The conducting ions in Example 4 are produced by partial hydrolysis of the solvent dimethyl formamide under acid conditions. Dimethylamine formate results from the hydrolysis of dimethyl formamide according to Equation 1, the reaction reaching an equilibrium:

(1) $\quad HCON(CH_3)_2 + H_2O \rightleftharpoons HCOONH_2(CH_3)_2$

The position of the equilibrium and reflux time required to attain it are a function of water content and acidity of the initial mixture. The above mixture was refluxed for a period of 48 hours when equilibrium appeared to have been established since there was no further increase in the conductivity of the solution.

Thus Example 4, after refluxing, contains, in addition to dimethyl formamide, boric acid and water, some dimethylamine formate. The resistivity after refluxing is about 200 ohm.-cm. at 25° C.

Example 4 is particularly suitable for use in tantalum foil capacitors of a wide working temperature range. The resistivity of this electrolyte is adjusted by varying the initial water content before refluxing, more water giving a less resistive electrolyte and less water a more resistive electrolyte.

Example 4 with the above resistance value of about 200 ohm-cm. at 25° C. was used in tantalum foil capacitors rated at .75 v. A group of 12 capacitors containing the electrolyte had a mean dissipation factor of 1.8% at 120 c.p.s. and retained 90% of their room temperature capacitance at −55° C. The initial leakage current at 125° C. was 0.009 μa./μf.-v. and at room temperature was 0.0005 μa./μf.-v. After 1800 hours with 75 v. D.C. applied at 125° C., the room temperature leakage current was 0.0004 μa./μf.-v. During the same period the observed capacity drop was 7%.

*Example 5*

| | Percent |
|---|---|
| Dimethyl formamide | 86 |
| Boric acid | 2.9 |
| Phosphorous acid | 0.6 |
| Water | 10.5 |

(Refluxed to Equilibrium)

The resistivity of the reacted mixture at 25° C. is 333 ohm-cm.

The electrolyte is particularly suitable for tantalum capacitors of wide working temperature and voltage range.

A 100 volt capacitor showed a leakage at room temperature, following a 150 hours performance at 125° C., of .0001 μa./μf.-v. At −55° C., it retained more than 90% of its room temperature capacitance. After 600 hours under life test conditions at 125° C. it had lost less than 0.5% of its original capacitance.

*Example 6*

| | Percent |
|---|---|
| Ethylene glycol | 41 |
| Deionized water | 32.8 |
| Ammonium formate | 24.6 |
| Phosphoric acid | 1.6 |

Example 6 has a resistivity of about 12 ohm-cm. at 25° C. and is particularly suitable for use in a capacitor at least one electrode of which consists of a sintered porous block (usually tantalum).

*Example 7*

| | Percent |
|---|---|
| Formic acid | 4.4 |
| Triethylamine | 5.2 |
| Boric acid | 1.3 |
| Phosphorous acid | 0.3 |
| Dimethyl acetamide | 67.5 |
| Glacial acetic acid | 18.4 |
| Water | 2.9 |

Example 7 is particularly suitable for use in a tantalum capacitor of wide working temperature and voltage range.

The leakage at room temperature of a 75 v. capacitor after 100 hours at working volts and 125° C., was .00007 μa./μf.-v. Capacitance drop after a further 800 hours on life test was about 3%. The capacitor retained more than 90% of its original capacitance when cooled to −55° C.

*End of Examples*

The above examples indicate the wide diversity of applications in which electrolyte systems of this invention can be used to advantage. The remarkably non-corrosive nature of such systems is demonstrated by the fact that when used in capacitors with aluminum electrodes such capacitors work perfectly satisfactorily at 125° C. Commercially available prior art capacitors with aluminum electrodes using previous electrolytes have, insofar as is known, not been capable of operation for sustained periods of time at such a temperature.

All the compositions described in the previous examples possess pH values between about 5 and 8, which is the preferred range for capacitors containing aluminum electrodes or other aluminum parts which corrode in contact with strongly acid or alkaline solutions. However, the electrolyte is not restricted to this pH range, particularly when used in conjunction with tantalum electrodes where electrolytes with lower pH values may be used with equal success.

A neutral electrolyte, however, has the advantage of being non-corrosive to other apparatus with which it may come into contact should the capacitor leak electrolyte. For this reason, the present electrolyte system offers an advantage in applications where acidic electrolytes are currently used as is the case in certain capacitors with a sintered porous tantalum electrode. This disadvantage is overcome by use of the electrolyte described herein, in which high conductivity and satisfactory operation at temperatures down to at least −55° C. are achieved by use of appropriate solvents.

A further advantage of electrolytes formulated in accordance with this invention lies in the case with which their resistance values can be adjusted for use in different voltage capacitors. Since the resistance is controlled almost entirely by the concentration of ammonium or amine formate, only this concentration need be changed. Two stock solutions, one containing sufficient formate to give the lowest resistance required, and the other containing no formate, can be mixed in appropriate proportions to give an electrolyte having an intermediate resistance value. This process is much simpler than the present practice of heating electrolytes to remove water and thus increase their resistance as is the usual procedure with conventional glycol borate electrolytes.

In summary the present invention provides a much improved electrolytic capacitor and an electrolyte therefor having certain aforementioned advantages which do not appear to have previously been provided by known devices of this sort.

We claim:

1. An electrolyte for use in an electrolytic capacitor, said electrolyte consisting essentially of a solution in an inert polar solvent containing from about 0.01 to about 5 moles of formate anions, from about 0.01 to about 5 moles of a member of the group consisting of primary, secondary and tertiary alkyl amines, aromatic amines, morpholine, pyridine and piperidine, and oxide film-forming anions selected from at least one of the groups consisting of borate, phosphate and phosphite, the borate anions being present at a concentration of from 0 to about 15% by weight of the solution, the phosphate and phosphite anions each being present at a concentration of from 0 to about 5% and the total concentration of said film-forming anions being at least about 0.1%.

2. An electrolyte according to claim 1 wherein said formate anions are present in an amount of from about 0.05 to about 2 moles.

3. An electrolyte according to claim 1 wherein said member of the group consisting of primary, secondary and tertiary alkyl amines, aromatic amines, morpholine, pyridine, and piperidine is present in an amount of from about 0.05 to about 2 moles.

4. An electrolyte according to claim 1 wherein said solvent is selected from the group consisting of water, methyl alcohol, ethyl alcohol, propyl alcohol, ethylene glycol, ethylene glycol mono-methyl ether, ethylene glycol mono-ethyl ether, ethylene glycol monobutyl ether, formamide, mono-methyl formamide, dimethyl formamide, dimethyl acetamide, the azeotropic mixture of dimethyl acetamide and acetic acid, glycolonitrile, and β-methoxypropionitrile.

5. An electrolytic device comprising a pair of electrodes at least one of which is formed of a film forming metal, and an electrolyte according to claim 1.

6. An electrolytic device comprising a pair of electrodes, at least one of which is formed of a metal selected from the group consisting of aluminum and tantalum and an electrolyte according to claim 1.

7. An electrolyte as described in claim 1 for use in an electrolytic capacitor having an aluminum electrode, in which the formate anions are present in a concentration of from 0.5% to 5% by weight of the solution.

8. An electrolyte as described in claim 1 for use in an electrolytic capacitor in which the anions selected from at least one of the groups consisting of borate, phosphate and phosphite are present in a concentration of 0.1% to 1% by weight of the solution.

9. An electrolyte for use in an electrolytic capacitor consisting essentially of an ethylene glycol solution of from 0.01 to about 5 moles of ammonium formate and at least one compound containing an anion selected from the group consisting of borate, phosphate and phosphite in an amount such that there is from about 0.1 to about 5% by weight of the solution of said anion.

10. An electrolyte for use in an electrolytic capacitor consisting essentially of 1 to 15% by weight of ammonium formate, 0–10% by weight of ammonium biborate, 0–2% by weight of diammonium hydrogen phosphate, at least one of said two last-mentioned compounds being present in an amount of at least 0.1% and the balance consisting of ethylene glycol.

11. An electrolytic capacitor comprising a pair of electrodes, at least one of which is formed of aluminum and an electrolyte according to claim 10.

12. An electrolyte for use in an electrolytic capacitor consisting essentially of 0.1 to 10% by weight of formic acid, 0.2% to 20% by weight of triethylamine, 0 to 4% by weight of boric acid, 0 to 4% by weight of phosphorous acid, at least one of said two last-mentioned compounds being present at a concentration of at least 0.3% by weight, and the total concentration of said two last-mentioned compounds never exceeding 4% by weight, and the balance consisting of dimethyl formamide.

13. An electrolytic capacitor comprising a pair of electrodes, at least one of which is formed of aluminum and an electrolyte according to claim 12.

14. An electrolyte for use in an electrolytic capacitor consisting essentially of 0.1 to 10% by weight of formic acid, 0.2 to 20% by weight of triethylamine, 0.2 to 5% by weight of boric acid, 0 to 99.5% by weight of ethylene glycol monoethyl ether and the balance consisting of dimethyl formamide.

15. An electrolytic capacitor comprising a pair of electrodes, at least one of which is formed of aluminum and an electrolyte according to claim 14.

16. An electrolyte for use in an electrolytic capacitor consisting essentially of 0.1 to 10% by weight of formic acid, 0.2 to 20% by weight of triethylamine, 0 to 5% by weight of boric acid, 0.1 to 2% by weight of phosphorous acid, 50 to 99.6% by weight of dimethyl acetamide, 0 to 49.6% by weight of glacial acetic acid and the balance consisting of water.

17. An electrolytic capacitor comprising a pair of electrodes, at least one of which is formed of tantalum and an electrolyte according to claim 16.

18. An electrolyte for use in an electrolytic capacitor consisting essentially of 5 to 30% by weight of ammonium formate, 0.1 to 5% by weight of phosphoric acid, 0 to 5% by weight of boric acid, 30 to 90% by weight of ethylene glycol and the balance consisting of water.

19. An electrolytic capacitor comprising a pair of electrodes, at least one of which is formed of tantalum and an electrolyte according to claim 18.

20. An electrolyte for use in an electrolytic capacitor comprising 5 to 30% by weight of ammonium formate, 0.1 to 5% by weight of phosphorous acid, 0 to 5% by weight of boric acid, 30 to 90% by weight of ethylene glycol and the balance consisting of water.

21. An electrolytic capacitor comprising a pair of electrodes, at least one of which is formed of tantalum and an electrolyte according to claim 20.

22. An electrolyte for use in an electrolytic capacitor consisting essentially of at least one member of the group consisting of boric acid, phosphorous acid and phosphoric acid and an equilibrium mixture of water, dimethyl formamide and dimethylamino formate, said electrolyte being the product obtained by refluxing to equilibrium 0–10% by weight boric acid, 0–10% by weight of phosphorous acid and 0–10% by weight of phosphoric acid, there being at least 0.1% by weight of at least one of said acids, water in an amount up to 50% by weight, and the balance consisting of dimethyl formamide.

23. An electrolytic capacitor comprising a pair of electrodes, at least one of which is formed of tantalum and an electrolyte according to claim 22.

References Cited in the file of this patent

UNITED STATES PATENTS

| | | |
|---|---|---|
| 2,108,995 | Ruben | Feb. 22, 1938 |
| 2,749,487 | Jenney et al. | June 5, 1956 |
| 2,839,472 | Nevalonny | June 17, 1958 |
| 2,882,233 | Otley | Apr. 14, 1959 |
| 2,944,026 | Robinson | July 5, 1960 |

FOREIGN PATENTS

| | | |
|---|---|---|
| 816,712 | Great Britain | July 15, 1959 |